(12) United States Patent
Dovek et al.

(10) Patent No.: US 8,567,045 B2
(45) Date of Patent: Oct. 29, 2013

(54) PROCESS TO MANUFACTURE A MAGNETIC WRITE HEAD

(75) Inventors: Moris Dovek, San Jose, CA (US); Glen Garfunkel, San Jose, CA (US); Po Kang Wang, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 13/367,355

(22) Filed: Feb. 6, 2012

(65) Prior Publication Data

US 2012/0137507 A1 Jun. 7, 2012

Related U.S. Application Data

(62) Division of application No. 10/706,381, filed on Nov. 12, 2003, now abandoned.

(51) Int. Cl.
*G11B 5/127* (2006.01)
*H04R 31/00* (2006.01)

(52) U.S. Cl.
USPC .......... 29/603.16; 29/603.13; 29/603.14; 29/603.15; 29/603.18; 216/22; 216/39; 216/41; 216/48; 216/65; 360/121; 360/122; 360/317

(58) Field of Classification Search
USPC ............ 29/603.11, 603.13–603.16, 603.18, 29/605, 606; 216/22, 39, 41, 48, 65; 360/121, 122, 317; 451/5, 41
See application file for complete search history.

(56) References Cited

U.S. PATENT DOCUMENTS

| | | | |
|---|---|---|---|
| 5,652,687 A | 7/1997 | Chen et al. | |
| 5,802,700 A | 9/1998 | Chen et al. | |
| 5,843,521 A | 12/1998 | Ju et al. | |
| 5,878,481 A | 3/1999 | Feng et al. | |
| 6,353,511 B1 | 3/2002 | Shi et al. | |
| 6,504,677 B1* | 1/2003 | Han et al. | 360/125.56 |
| 6,538,844 B2 | 3/2003 | Takano et al. | |
| 6,791,793 B1* | 9/2004 | Chen et al. | 360/125.12 |
| 2002/0057526 A1* | 5/2002 | Sasaki | 360/126 |
| 2002/0080521 A1* | 6/2002 | Takano et al. | 360/122 |
| 2003/0021063 A1* | 1/2003 | Kuroda et al. | 360/125 |

* cited by examiner

*Primary Examiner* — Paul D Kim
(74) *Attorney, Agent, or Firm* — Saile Ackerman LLC; Stephen B. Ackerman

(57) ABSTRACT

As track densities increase, it becomes increasingly important, while writing in a given track, not to inadvertently write data in adjoining tracks. This problem has been overcome by limiting the width of material in the ABS plane to what it is at the write gap. The part of the lower pole that is wider than this is recessed back away from the ABS, thereby greatly reducing its magnetic influence on adjacent tracks. Four different embodiments of write heads that incorporate this notion are described together with a description of a general process for their manufacture.

8 Claims, 4 Drawing Sheets

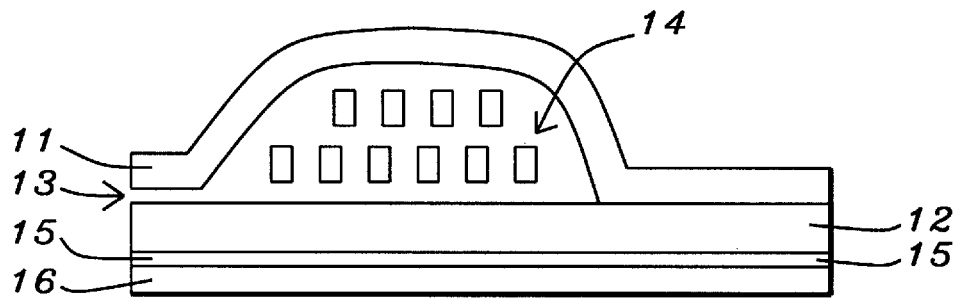
FIG. 1 – Prior Art
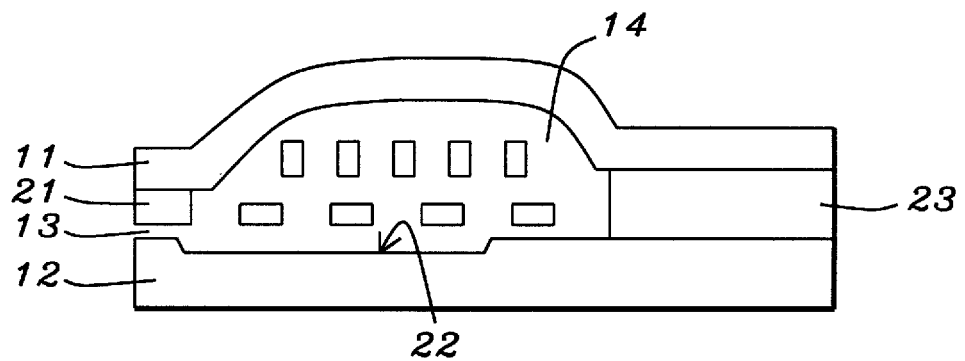
FIG. 2 – Prior Art
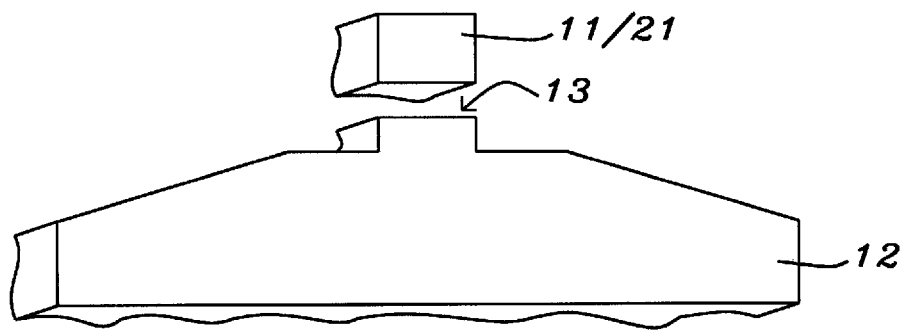
FIG. 3 – Prior Art

PROCESS TO MANUFACTURE A MAGNETIC WRITE HEAD

This is a divisional application of U.S. patent application Ser. No. 10/706,381 filed on Nov. 12, 2003, now abandoned, which is herein incorporated by reference in its entirety, and assigned to a common assignee.

RELEVANT FIELD

The disclosed process relates to the general field of magnetic write heads with particular reference to eliminating neighboring track erasure.

BACKGROUND

A typical write head structure for a magnetic disk system is schematically illustrated in FIG. 1. Its principal parts are lower pole 12 and upper pole 11 (commonly referred to as P1 and P2, respectively. These are magnetically connected at one end and separated by a small non-magnetic layer 13 (the write gap) at the other end. The track width will be defined by the P2 width at the gap. P1 may be notched through a self aligned process, known as partial pole trim (PPT), to better define the written transitions. Coil 14 is located in the space enclosed by P1 and P2 and is the source of the magnetic field that is focused by the two pole pieces. All seen in the figure is a magnetic shield layer 16 which is electrically isolated from the lower pole by dielectric layer 15.

FIG. 2 shows a variation on the basic design seen in FIG. 1. In this case a secondary upper pole 21 is 'stitched' in between 11 (P2) and gap 13. This is for ease of fabrication so that the track width definition can be done on relatively flatter topography. An additional feature, not present in the design of FIG. 1, is shallow trench 22 which is etched into lower pole 12. Since trench 22 has sloping sides, the depth to which it is etched can be used to fine tune the length of lower pole 12 that is part of the write gap 13. This is usually referred to as the throat. This allows for a further concentration of the available flux within the write gap. In the stitched pole design, the track width is defining part of pole 21 as well as the back gap connection 23 which are fabricated immediately following the deposition of write gap 13.

FIG. 3 is an isometric view of part of FIG. 1 or FIG. 2 as seen when looking up from the magnetic track at the air bearing surface that passes over it (so-called ABS view). It is important to note that the surfaces of the upper pole (11 in FIG. 1 or 21 in FIG. 2), the gap 13, and the lower pole 12, are all coplanar. One consequence of this, the standard structure in use today, is the unintended erasure of adjacent tracks on the disk as narrower tracks and higher track densities are developed. Most improvements that have been proposed, such as increased PPT depth, smooth P 1 topography, and narrower gap all come with either process challenges or reduced on track writeablity performance.

As track densities increase, the read head extracts the recorded information from an ever decreasing narrow track. It becomes increasingly important not to affect the integrity of this narrow track of data. In the structure shown in FIG. 3, P2 has magnetic material confined to the written track. P1. however, still includes material that extends outside the track width (TW) defining region. This may lead to unintended writing on an adjacent track and may therefore affect the data integrity of the system.

A routine search of the prior art was performed with the following references of interest being found:

U.S. Pat. No. 6,353,511 B1 (Shi et al.) shows a process for a improved Write head. U.S. Pat. No. 5,878,481(Feng et al.) shows a pole trimming process for a write head. U.S. Pat. No. 5,843,521 (Ju et al.) and U.S. Pat. No. 5,802,700 (Chen et al.) are related patents. U.S. Pat. No. 5,652,687 (Chen et al.) shows a planarized write head process.

SUMMARY

It has been an object of at least one embodiment of the disclosed process to provide a magnetic write head that does not write unintentionally onto data tracks located on either side of the track that is being written.

Another object of at least one embodiment of the disclosed process has been that this be accomplished without a reduction in write field strength or track density.

Still another object of at least one embodiment of the disclosed process has been to provide a process for the manufacture said write head.

A further object of at least one embodiment of the disclosed process has been that said process not require significant modification of existing processes for the manufacture of write heads.

These objects have been achieved by limiting the width of material in the ABS plane to what it is at the write gap. The part of the lower pole that is wider than this is recessed away from the ABS, thereby greatly reducing its magnetic influence on adjacent tracks. Four different embodiments of write heads that incorporate this notion are described together with a description of a general process for their manufacture.

BRIEF DESCRIPTION OF THE DRAWINGS

FIG. 1 illustrates a basic read head design.

FIG. 2 shows the basic design of FIG. 1 modified by use of a stitched upper pole.

FIG. 3 is the ABS view of FIGS. 1 and 2 in isometric projection.

DESCRIPTION OF THE PREFERRED EMBODIMENTS

The key novel feature of the disclosed process is the restriction of the width of P1 to TW for a distance such that there is no P1 wider than the track width at the ABS. This is achieved by causing P1 beyond this distance to be recessed away from the ABS, thereby greatly reducing its magnetic influence on the adjacent tracks. Thus, the amount of P1 at the ABS should exceed the amount of P1 that is recessed

1$^{st}$ Embodiment

Figure 4:
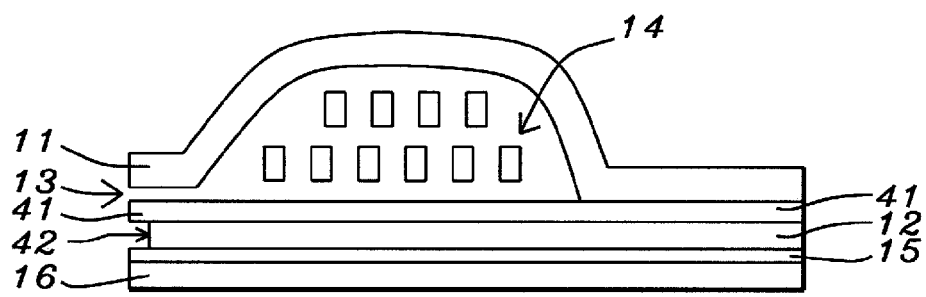
FIG. 4 shows the structure of FIG. 1 modified according to the teachings of the disclosed process.
Figure 7:
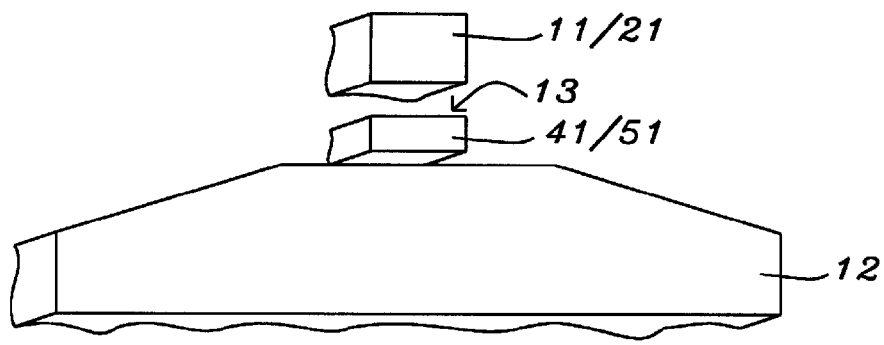
FIG. 7 is an isometric view of a portion of a fourth embodiment.

Referring now to FIG. 4, we show there a structure that is similar to the one shown in FIG. 1, but modified in accordance with the disclosed teaching. As before, upper pole 11 and lower pole 12 enclose, between them, field coil 14. The key novel feature is ledge 41 of magnetic (high permeability) material that extends outwards away from the main body of lower pole 12. The outer edge of ledge 41 has the same width as, and is in alignment with, the outer edge of top pole 11 so that write gap 13 lies between them and said widths define the track width TW. As a result, most of bottom pole 12 is set back some distance from the ABS and so has relatively little magnetic interaction with the disk surface. FIG. 7 is an isometric view that illustrates the spatial relationships between top pole 11 and bottom poles 41 and 12.

For purposes of simplification, FIG. 4 has been drawn as though ledge 41 is a cantilever. In actuality, a layer of insulation is present below 41 to support it. Details of this support layer are provided later, in the section where we describe the process for manufacturing this structure.

$2^{nd}$ Embodiment

Figure 5:
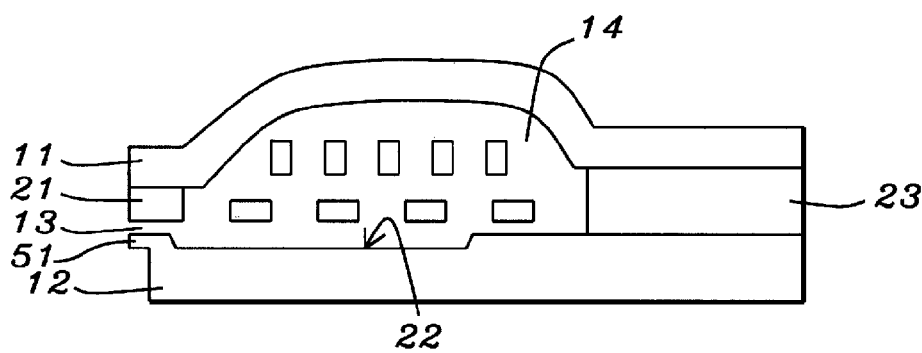
FIG. 5 shows the structure of FIG. 2 modified according to the teachings of the disclosed process.
Figure 13:
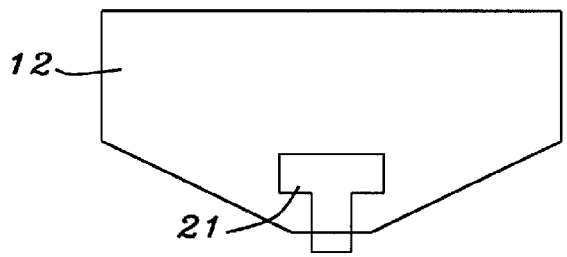
FIG. 13 is a plan view of the structure formed through the disclosed process.

FIG. 5 shows a structure similar that seen in FIG. 2. As before, there is a general similarity to the first embodiment illustrated in FIG. 4 with the addition of stitched secondary top pole 21 and shallow trench 22. The key departure is the addition to the structure of ledge 51, which analogous to ledge 41 of the first embodiment, and serves the same purpose. FIG. 7 is an isometric view that illustrates the spatial relationships between top pole 21 and bottom poles 51 and 12 while FIG. 13 is a plan view of this structure.

$3^{rd}$ Embodiment

This variation of the basic structure is sometimes preferred because certain parts, such as pole 11, are easier to manufacture. By going to a somewhat thicker inter-pole connector 23 and using a single turn for field coil 23, top pole 11 can be flat rather than humped, as in the previous two embodiments. The bottom pole in this case is composed of two layers, 62 and 12, which, in prior art versions of this variant (not shown), would extend from bottom pole 12 all the way to write gap 13.

Figure 6:
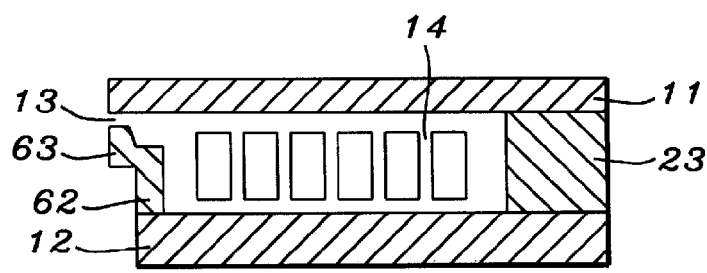
FIG. 6 illustrates a third embodiment of the disclosed process.

As seen in FIG. 6, in the structure formed by the disclosed process the secondary bottom pole is in two parts 62 and 63. Part 62 extends upwards from bottom pole 12 but not all the way to write gap 13. This leaves room for second part 63 which, in addition to extending the rest of the way up to the write gap, also extends laterally away from part 62 so as to be aligned with the ABS end of top pole 11. As a result, the lower part of the secondary bottom pole and all of the main bottom pole 12 are set back from the ABS, thereby reducing their magnetic interaction with the write track.

$4^{th}$ Embodiment

Figure 14:
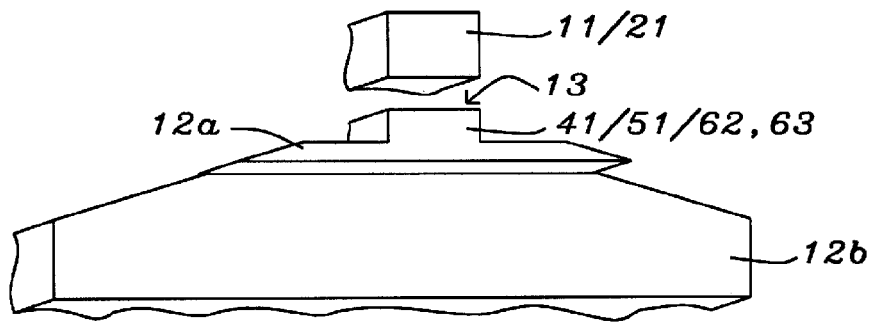
FIG. 14 is an isometric view of part of a fourth embodiment.

This embodiment, illustrated in FIG. 14, entails still further modification of the three embodiments just discussed. In all three cases, there is no recessing of the secondary lower poles, recessing being delayed so that portion 12a of the primary lower pole also remains coplanar with the ABS. The remainder 12b of the primary lower pole is recessed as in the previous embodiments. This embodiment is unsuitable for extremely high track densities (greater than about 125,000 tracks per inch) but for lesser densities its advantage is manufacturability; the thickness and height of 12a (the non-recessed part of P1) and the depth of the partial pole trim (41, 51, 62) do not need to be the same.

Manufacturing Process

Figure 8:
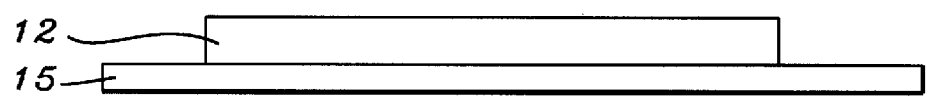
FIGS. 8-12 illustrate successive steps in the disclosed process.
Figure 9:
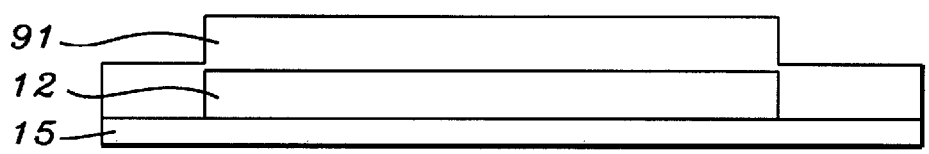

Referring now to FIG. 8, the disclosed process begins with the provision of substrate 15 on which is deposited, and then patterned, layer 12 of a high magnetic permeability material to form the primary lower pole. Next, as seen in FIG. 9, layer of insulating material 91 is deposited on substrate 15 as well as on primary lower pole 12, making sure that its thickness exceeds that of 12.

Figure 10:
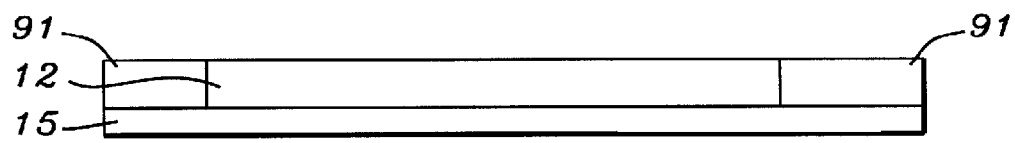
Figure 11:
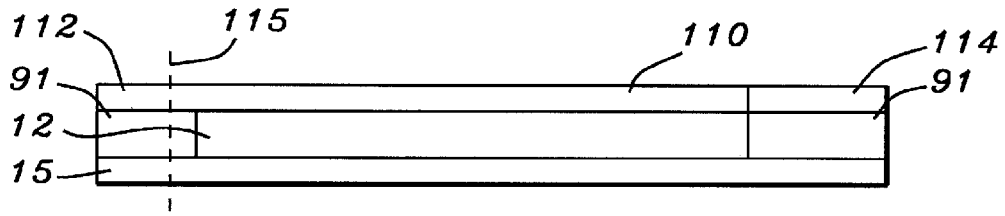
Figure 12:
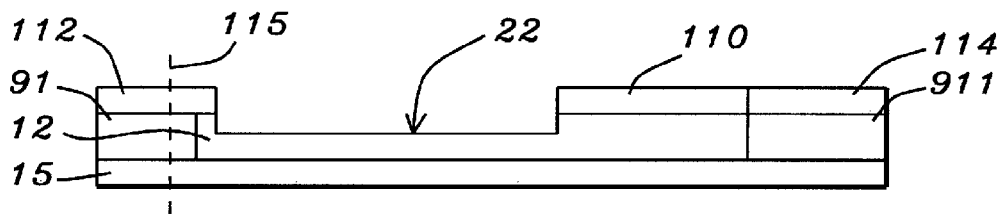

The structure is then planarized until all insulating material has been removed from over the primary lower pole so that the remaining insulation abuts, and extends away from, the primary pole. This is illustrated in FIG. 10. Second layer 110 of high magnetic permeability material is next deposited and patterned to form a secondary lower pole that covers primary pole 12 and extends over insulating layer 91 on one side so as to form ledge 112. Optionally, an additional layer 114 of insulation may be introduced (in the same way as just described for 91) to fill in the part above 91 that is not covered by 110. Since 110 is relatively thin, this step may be omitted without significant consequence.

In the case of the second embodiment (FIG. 5), shallow trench 22 is formed at this time. For all embodiments, completion of the structure now proceeds along routine lines—field coil 14 is formed over, and insulated from, the lower poles following which the upper magnetic pole 11 is formed to overlie it. At one end the two poles are in magnetic contact with one another while at the other end they are by layer of non-magnetic material 13 to form the write gap whose width serves to define the track width TW. Finally, the ABS end of the structure is planarized as far as plane 115, thereby determining how far ledge 112 extends out away from the main body of the lower pole.

What is claimed is:

1. A process to manufacture a magnetic write head, comprising:
   on a substrate, depositing and then patterning a first layer of high magnetic permeability material to form a primary lower magnetic pole having a first end;
   depositing a layer of insulating material on said substrate and on said primary lower magnetic pole to a thickness greater than that of said primary lower magnetic pole to form a structure;
   planarizing the structure until all insulating material has been removed from over said primary lower magnetic pole, whereby said insulating layer abuts, and extends away from, said primary lower magnetic pole on one side;
   shaping a portion of said primary lower magnetic pole into first and second parts, said first part extending upwards at said primary lower magnetic pole's first end to a first height and said second part extending laterally from said first part so as to be in alignment with an end of an upper magnetic pole having a width,
   said second part also extending upwards to a second height above said primary lower magnetic pole that is greater than said first height, and
   said second part being separated from said upper magnetic pole by a layer of non-magnetic material, whereby it forms a write gap, said second part having a width, at the write gap, equal to said upper magnetic pole width, whereby a track width is defined;
   depositing and patterning a second layer of high magnetic permeability material to form a secondary lower pole that covers said primary lower magnetic pole and extends over said insulating layer on said one side as a ledge having a width;
   forming a field coil over, and insulated from, said secondary lower magnetic pole;

overlying said field coil with said upper magnetic pole and contacting said primary lower magnetic pole at a location well removed from said write gap; and through planarizing, removing material from said ledge, said write gap, and said upper magnetic pole until said ledge extends beyond said primary lower magnetic pole by a final amount.

2. The process described in claim 1 further comprising:

forming a stitched pole between said write gap and said upper magnetic pole, thereby concentrating magnetic flux from said magnetic upper pole at said write gap; and prior to forming said field coil, etching a trench in said primary lower magnetic pole whereby said shelf presents a reduced area to said upper magnetic pole.

3. The process described in claim 1 wherein said first layer of high magnetic permeability material is selected a group consisting of NiFe, CoNiFe, FeTaN, FeAlN, CoTaN, CoAlN, or CoFeN and has a thickness between about 0.3 and 3 microns.

4. The process described in claim 1 wherein said insulating layer is selected a group consisting of silicon oxide, aluminum oxide, tantalum oxide, Al, Rh, Ru, Cu, NiCu, or Ta and is deposited to a thickness between about 1 and 2.5 microns.

5. The process described in claim 1 wherein said second layer of high magnetic permeability material is selected a group consisting of NiFe, CoNiFe, FeTaN, FeAlN, CoTaN, CoAlN, or CoFeN and has a thickness between about 0.2 and 2 microns.

6. The process described in claim 1 wherein said upper magnetic pole is selected a group consisting of NiFe, CoNiFe, FeTaN, FeAlN, CoTaN, CoAlN, or CoFeN and has a thickness between about 0.2 and 2 microns.

7. The process described in claim 1 wherein said upper magnetic pole width at the write gap is between about 0.05 and 1 microns.

8. The process described in claim 1 wherein the final amount that said ledge extends away from said primary lower magnetic pole is between about 0.1 and 1 microns.

* * * * *